US010625595B2

(12) United States Patent
Park et al.

(10) Patent No.: US 10,625,595 B2
(45) Date of Patent: Apr. 21, 2020

(54) AIR GUIDE STRUCTURE OF VEHICLE

(71) Applicants: Hyundai Motor Company, Seoul (KR); Kia Motors Corporation, Seoul (KR); Hanon Systems, Daejeon (KR)

(72) Inventors: Dang-Hee Park, Seoul (KR); Jung-Hyeok Lim, Gyeonggi-do (KR); Min-Young Lee, Seoul (KR); Seung-Hoon Lee, Seoul (KR); Il-Suk Yang, Gyeonggi-do (KR); Sun-An Jeong, Daejeon (KR); Tae-Soo Chun, Daejeon (KR); Yong-Kil Cha, Daejeon (KR); Seong-Oh Jeon, Daejeon (KR); A-Ra Jo, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 0 days.

(21) Appl. No.: 16/151,236

(22) Filed: Oct. 3, 2018

(65) Prior Publication Data
US 2019/0202284 A1    Jul. 4, 2019

(30) Foreign Application Priority Data

Dec. 29, 2017    (KR) .................. 10-2017-0183528

(51) Int. Cl.
*B60K 11/08*    (2006.01)
*B60K 11/06*    (2006.01)
(Continued)

(52) U.S. Cl.
CPC .............. *B60K 11/08* (2013.01); *B60K 11/04* (2013.01); *B60K 11/06* (2013.01); *B60K 11/085* (2013.01); *B60K 13/02* (2013.01); *F02B 29/0431* (2013.01)

(58) Field of Classification Search
CPC ....... B60K 11/08; B60K 11/085; B60K 11/04; F02B 29/0431
See application file for complete search history.

(56) References Cited

U.S. PATENT DOCUMENTS

| 7,080,704 | B1 * | 7/2006 | Kerner | .................. | B62M 27/02 |
| | | | | | 180/68.1 |
| 8,091,668 | B2 * | 1/2012 | Amano | .................. | B60K 6/445 |
| | | | | | 123/41.05 |
| 8,316,974 | B2 | 11/2012 | Coel et al. | | |
| 8,371,407 | B2 | 2/2013 | Hassdenteufel et al. | | |
| 8,561,741 | B2 | 10/2013 | Kurokawa et al. | | |

(Continued)

FOREIGN PATENT DOCUMENTS

EP    2371682 A2    10/2011
JP    2006-069396 A    3/2006
(Continued)

OTHER PUBLICATIONS

Extended European Search Report for European Patent Application No. 18201765, dated Jan. 2, 2019, 34 pages.

*Primary Examiner* — Brian L Swenson
(74) *Attorney, Agent, or Firm* — Mintz Levin Cohn Ferris Glovsky and Popeo, P.C.; Peter F. Corless

(57) ABSTRACT

An air guide structure of a vehicle is provided in which a duct for introducing outdoor air into an air cooling device of an engine includes an upper duct that is positioned in a radiator grille and a lower duct that is positioned in a bumper grille. The air guide structure includes a variable screen that is positioned between the upper duct and the lower duct and is formed to have a shape or a position that is changed according to a difference in flow rate between upper flow and lower flow introduced through the upper duct and the lower duct, respectively. The variable screen is disposed on a duct wall surface between the upper duct and the lower duct.

15 Claims, 19 Drawing Sheets

(51) Int. Cl.
*B60K 13/02* (2006.01)
*F02B 29/04* (2006.01)
*B60K 11/04* (2006.01)

(56) References Cited

U.S. PATENT DOCUMENTS

| | | | |
|---|---|---|---|
| 9,061,585 B2* | 6/2015 | Fujiu | B60K 11/08 |
| 10,293,679 B2* | 5/2019 | Dubey | B60K 11/08 |
| 2006/0095178 A1 | 5/2006 | Guilfoyle et al. | |
| 2006/0102109 A1* | 5/2006 | Becker | B60K 11/08 |
| | | | 123/41.48 |
| 2011/0097984 A1* | 4/2011 | Hasegawa | B60K 11/085 |
| | | | 454/152 |
| 2012/0325324 A1* | 12/2012 | Widmer | B62D 25/084 |
| | | | 137/1 |
| 2013/0303070 A1* | 11/2013 | Ozawa | H01M 8/04089 |
| | | | 454/151 |
| 2015/0041229 A1* | 2/2015 | Maurer | B60K 11/06 |
| | | | 180/68.1 |
| 2017/0043659 A1* | 2/2017 | Vacca | B60K 11/08 |

FOREIGN PATENT DOCUMENTS

| | | |
|---|---|---|
| KR | 10-0514534 B1 | 9/2005 |
| KR | 10-1362332 B1 | 2/2014 |
| KR | 10-2015-0124725 A | 11/2015 |
| WO | 2012/084251 A1 | 6/2012 |
| WO | 2013/161497 A1 | 10/2013 |

* cited by examiner

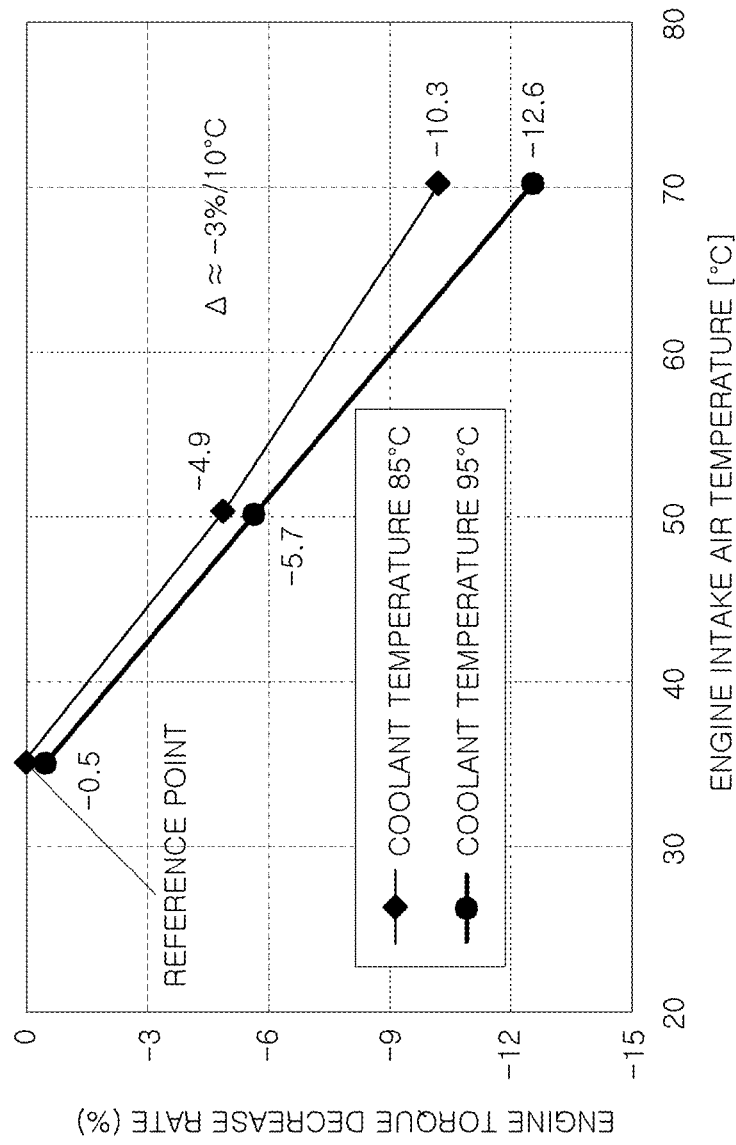

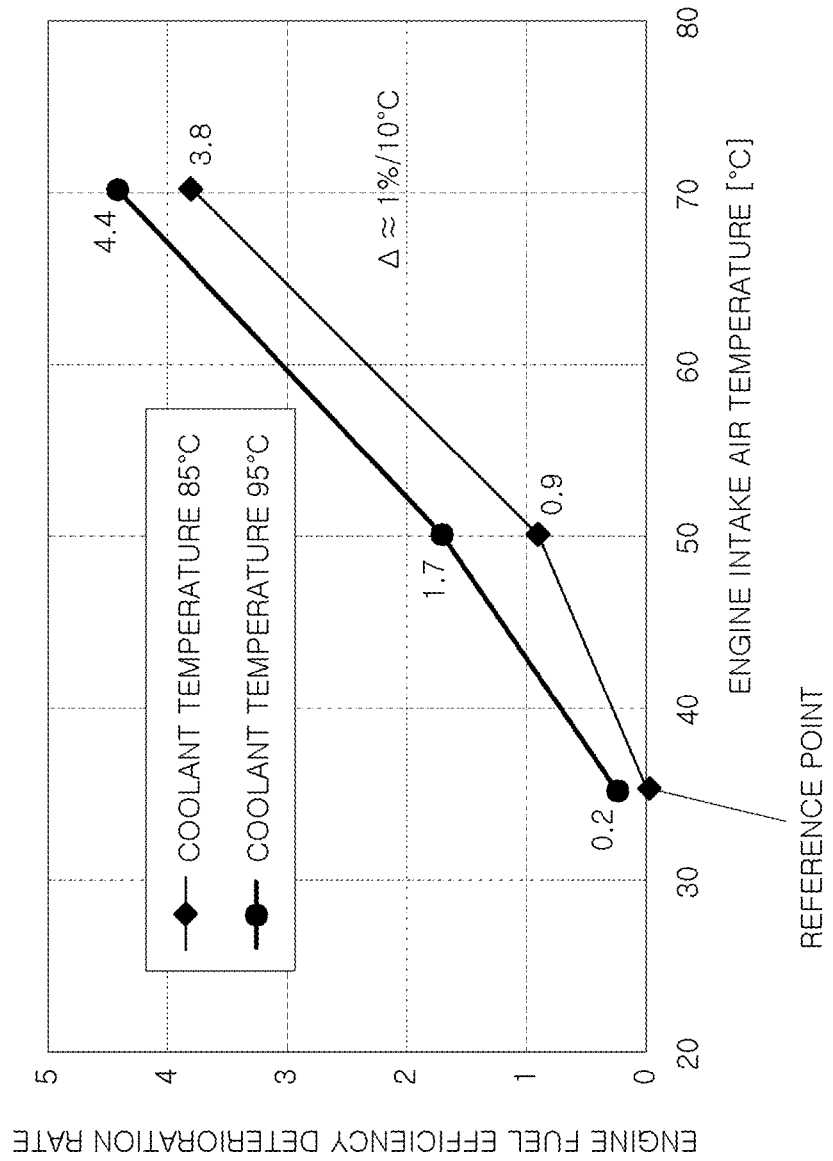

FIG.7A
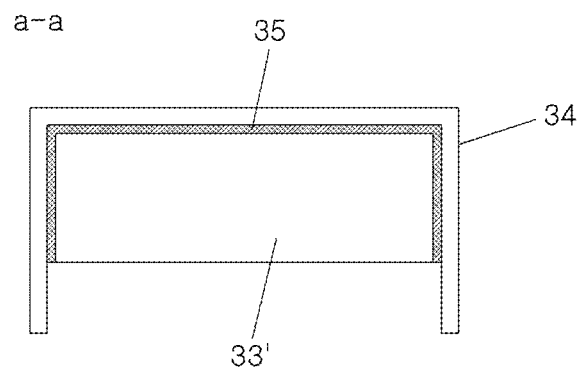
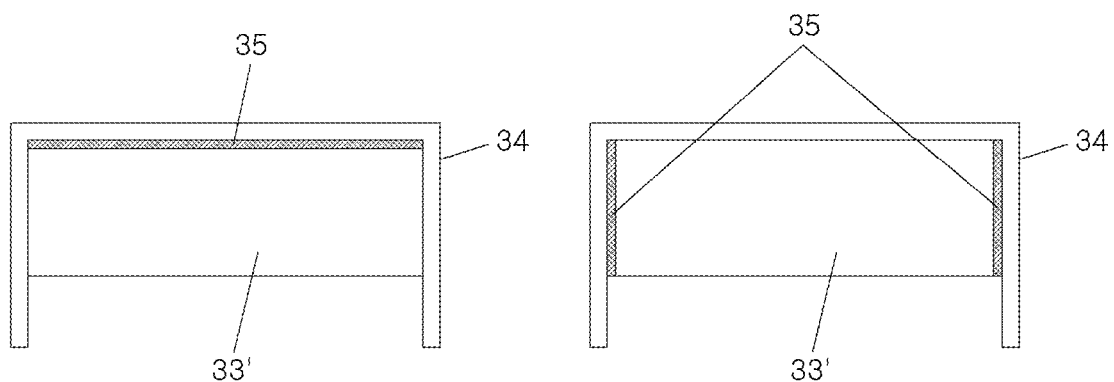

AIR GUIDE STRUCTURE OF VEHICLE

CROSS-REFERENCE TO RELATED APPLICATIONS

This application claims priority to Korean Patent Application No. 10-2017-0183528, filed on Dec. 29, 2017, the disclosure of which is incorporated herein by reference in its entirety.

BACKGROUND

Field of the Invention

The present invention relates to an air guide structure of a vehicle, and more particularly, to an intercooler air guide structure of a turbo engine vehicle.

Description of Related Art

FIG. 1 is a schematic view of a turbo engine system according to the related art, and FIGS. 2A and 2B are graphs illustrating influence of a temperature of supercharged air on engine torque and fuel efficiency of the turbo engine system according to the related art. Referring to FIG. 1, a turbo engine cools high temperature supercharged air compressed through a turbo charger 10 by passing the supercharged air through an intercooler 30 before supplying the supercharged air to an engine 20. As illustrated in FIGS. 2A and 2B, a temperature of the supercharged air supplied to the engine 20 significantly affects torque and fuel efficiency of the engine 20, and generally, as the temperature of the supercharged air is decreased, the torque of the engine 20 is increased, and the fuel efficiency is improved. Therefore, in the turbo engine, increasing cooling efficiency of the intercooler 30 is an important factor in improving power and fuel efficiency.

FIG. 3 is a view illustrating a duct type air guide of a side by side (SBS) type installed at a side surface portion of a radiator grille and a bumper grille of a vehicle according to the related art. Referring to FIG. 3, the intercooler 30 cools high temperature supercharged air supplied from the turbo charger 30 by outdoor air supplied from a radiator grille 1 and a bumper grille 2 while the vehicle is being driven. Accordingly, the duct type air guide 3 of the SBS type is installed at a side surface portion of the radiator grille 1 and the bumper grille 2 of the vehicle. The duct type air guide 3 of the SBS type includes a radiator grille inlet duct 31 disposed in the radiator grille 1 and a bumper grille inlet duct 32 disposed in the bumper grille 2 as ducts into which outdoor air is introduced.

FIG. 4A is a cross-sectional view illustrating a duct type air guide in which a fixed screen is installed according to the related art, and FIG. 4B is a view illustrating a flow field in the duct type air guide illustrated in FIG. 4A according to the related art. Referring to FIG. 4A, in the duct type air guide 3 according to the related art, a fixed screen (e.g., partition wall) 33 of which a shape and a position are fixed is installed between the radiator grille inlet duct 31 and the bumper grille inlet duct 32 that are vertically disposed to divide an area of heat exchange of the intercooler 30 by outdoor air introduced through the respective ducts at a ratio of 1:1.

However, referring to FIG. 4B, flow rates of a flow A of outdoor air introduced through the radiator grille 1 and a flow B of outdoor air introduced through the bumper grille 2 are different based on designs of the radiator grille 1 and the bumper grille 2 of each vehicle, and even in the case of the same design, a difference in flow rate occurs based on a vehicle speed. However, the duct type air guide 3 in which the fixed screen 33 is installed may not reflect the difference in the flow rate, thus a flow at a front surface portion of the intercooler in the duct may not be smoothly formed, which results in decrease in cooling efficiency of the intercooler, thereby decreasing torque of the engine and fuel efficiency.

SUMMARY

An aspect of the present invention provides an air guide structure of a vehicle capable of maximizing cooling performance of an intercooler by installing a variable screen of which a shape or a position may be changed based on a pressure difference resulting from a difference in flow rate between an upper flow and a lower flow introduced through a duct. Other objects and advantages of the present invention can be understood by the following description, and become apparent with reference to the embodiments of the present invention. Also, it is obvious to those skilled in the art to which the present invention pertains that the objects and advantages of the present invention may be realized by the means as claimed and combinations thereof.

In accordance with an exemplary embodiment of the present invention, an air guide structure of a vehicle in which a duct for introducing outdoor air into an air cooling device of an engine includes an upper duct positioned in a radiator grille and a lower duct positioned in a bumper grille, the air guide structure may include: a variable screen positioned between the upper duct and the lower duct and formed to have a shape or a position changed based on a difference in flow rate between upper flow and lower flow introduced through the upper duct and the lower duct, respectively. The variable screen may be disposed on a duct wall surface between the upper duct and the lower duct.

In particular, the variable screen may be formed of a material having elasticity to allow the shape of the variable screen to be changed. The material having elasticity may be a rubber material. The shape of the variable screen may be changed based on the difference in flow rate between the upper duct and the lower duct occurring based on a vehicle speed of the vehicle to deform the variable screen toward a duct of which a flow rate is less than the other to decrease a pressure difference resulting from the difference in flow rate.

A pressure adjustment aperture may be formed in the variable screen to adjust an amount of deformation of the variable screen according to the difference in flow rate. The variable screen may be fixedly coupled to the duct wall surface between the upper duct and the lower duct by bonding or fusion. The variable screen may be fixedly coupled to the duct wall surface between the upper duct and the lower duct by rivet connection.

A flange part for connecting one side portion of the variable screen using a rivet may be formed on the duct wall surface between the upper duct and the lower duct. The variable screen may be fixedly coupled to the duct wall surface between the upper duct and the lower duct by forcible fitting. A flange part that connects the variable screen may be formed on the duct wall surface between the upper duct and the lower duct, a forcible fitting groove may be formed in the flange part, and a forcible fitting protrusion may be formed at one side surface of the variable screen, the forcible fitting protrusion being forcibly fitted into the forcible fitting groove of the flange part.

The variable screen may be fixedly coupled to the duct wall surface between the upper duct and the lower duct by casing. Additionally, a screen holder may be attached on one side surface of the variable screen and a coupling aperture in which the screen holder is fixedly coupled may be formed in the duct wall surface between the upper duct and the lower duct. When the variable screen is inserted into the duct while passing through the coupling aperture, the screen holder may be fitted in the coupling aperture, to fixedly couple the variable screen to the duct wall surface between the upper duct and the lower duct.

The position of the variable screen may be changed vertically between the upper duct and the lower duct. In particular, the position of the variable screen may be moved according to the difference in flow rate between the upper duct and the lower duct occurring based on a vehicle speed of the vehicle and thus, the variable screen may be moved toward a duct of which a flow rate is less than the other to decrease a pressure difference resulting from the difference in flow rate. A pressure adjustment aperture may be formed in the variable screen to adjust an amount of vertical movement of the variable screen according to the difference in flow rate.

An upper frame and a lower frame may be fixedly installed on the duct wall surface between the upper duct and the lower duct while being vertically spaced apart from each other, and a vertical movement guide that guides the variable screen to move vertically may be installed between the upper frame and the lower frame. A guide aperture through which the vertical movement guide passes may be formed in the variable screen, to allow the variable screen to be slidably coupled to the vertical movement guide.

BRIEF DESCRIPTION OF THE DRAWINGS

A brief description of each drawing is provided to more sufficiently understand drawings used in the detailed description of the present invention.

FIGS. 2A and 2B are graphs illustrating influence of a temperature of supercharged air on engine torque and fuel efficiency of the turbo engine system according to the related art;

FIGS. 7A to 7D are views illustrating a duct coupling structure of the variable screen according to the first exemplary embodiment of the present invention;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an air guide structure of a vehicle according to the present invention will be described in detail with reference to the accompanying drawings. However, detailed descriptions for well-known functions or configurations will be omitted in order not to unnecessarily obscure the gist of the present invention.

Figure 1:
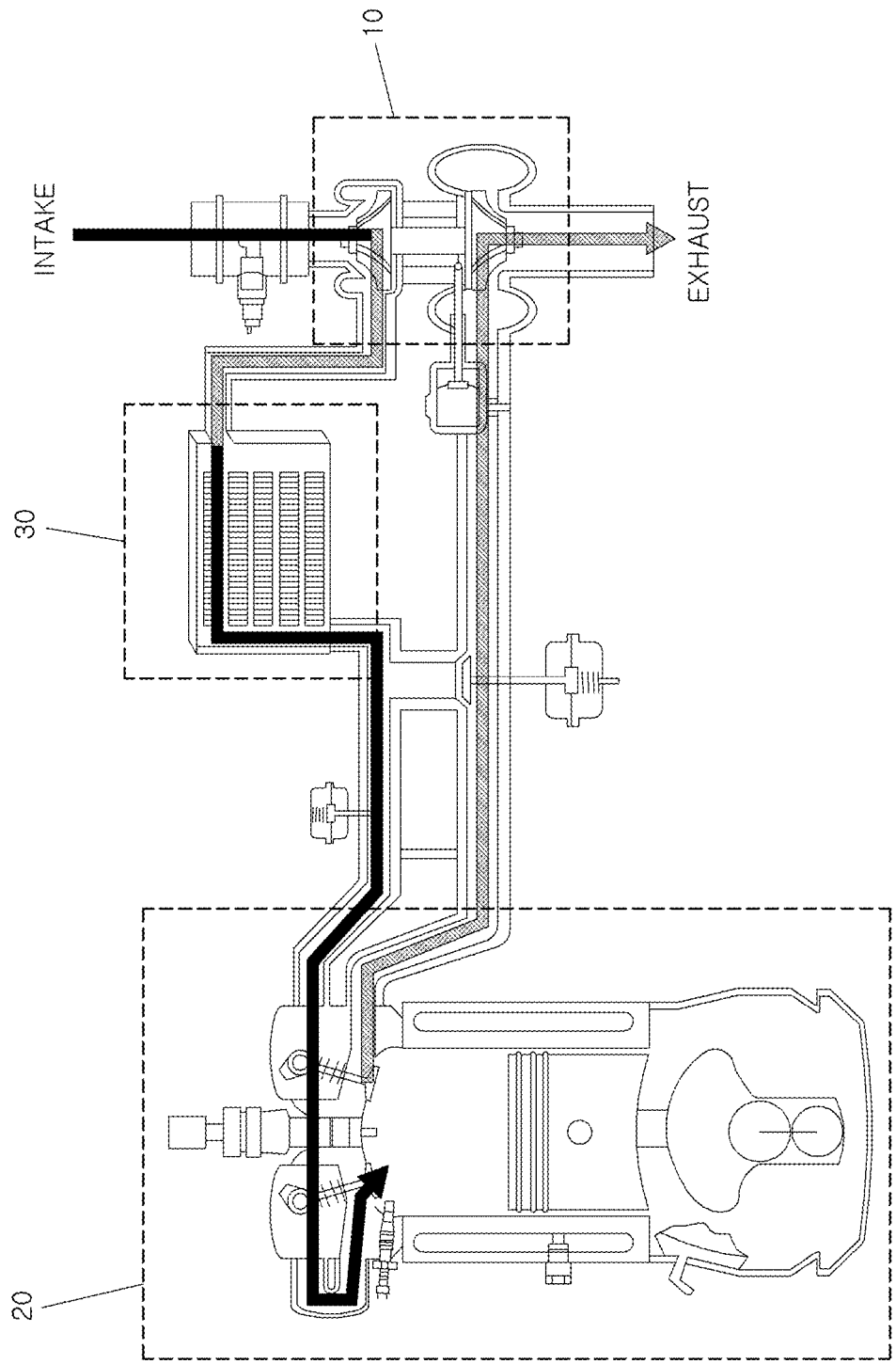
FIG. 1 is a schematic view of a turbo engine system according to the related art.
Figure 3:
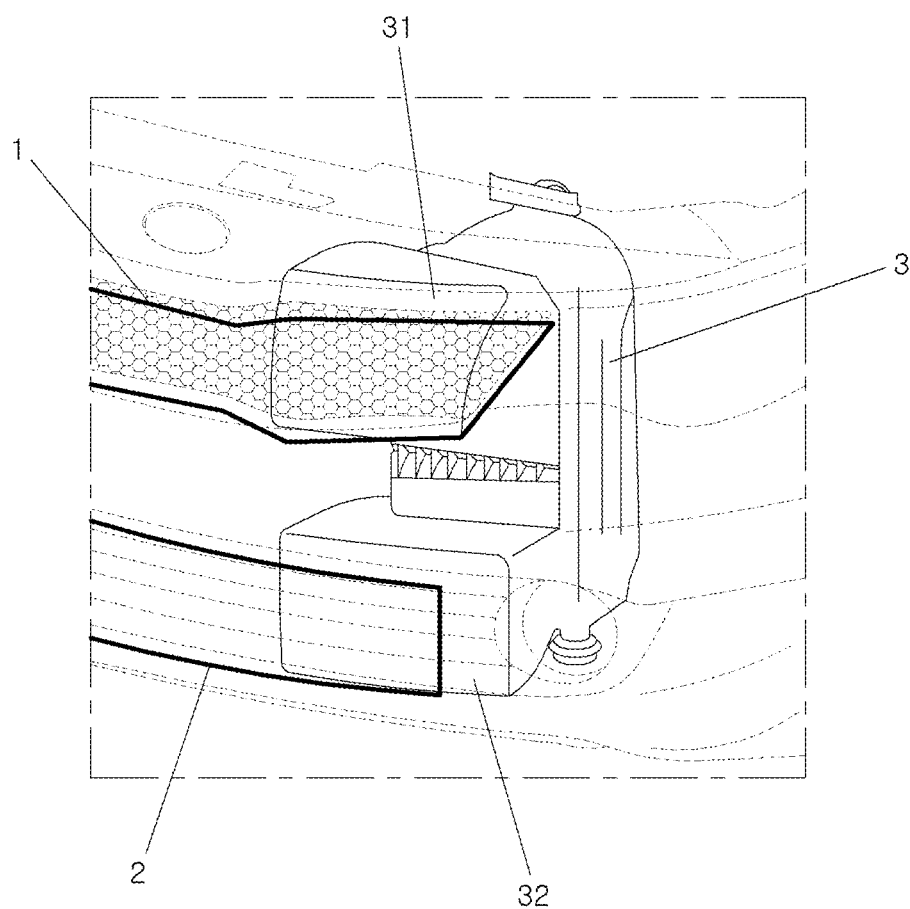
FIG. 3 is a view illustrating a duct type air guide of a side by side (SBS) type installed at a side surface portion of a radiator grille and a bumper grille of a vehicle according to the related art.
Figure 4A:
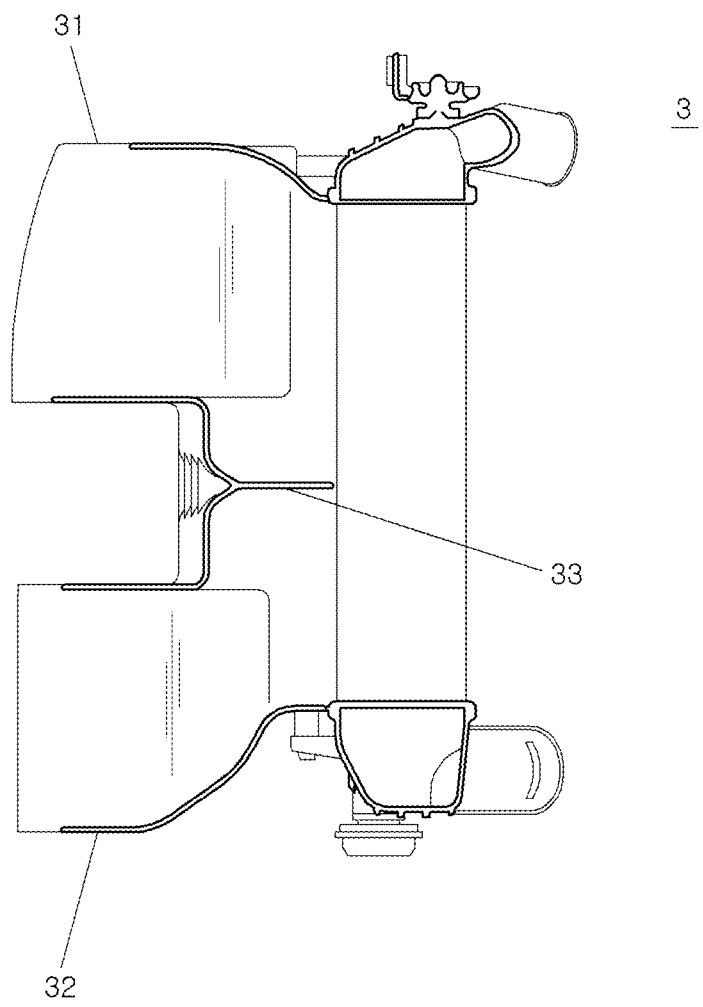
FIG. 4A is a cross-sectional view illustrating a duct type air guide in which a fixed screen is installed according to the related art.
Figure 4B:
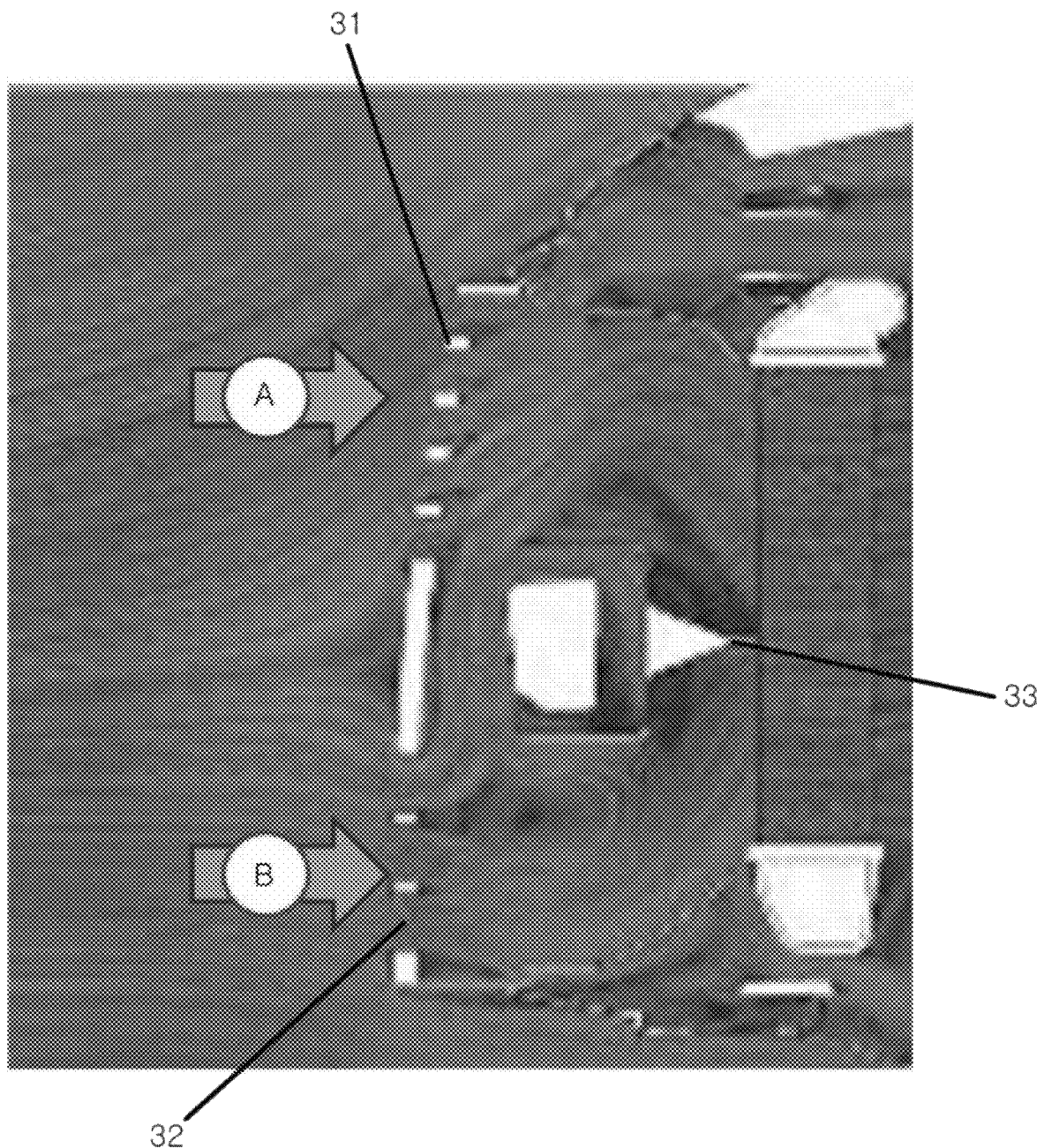
FIG. 4B is a view illustrating a flow field in the duct type air guide illustrated in FIG. 4A according to the related art.
Figure 5:
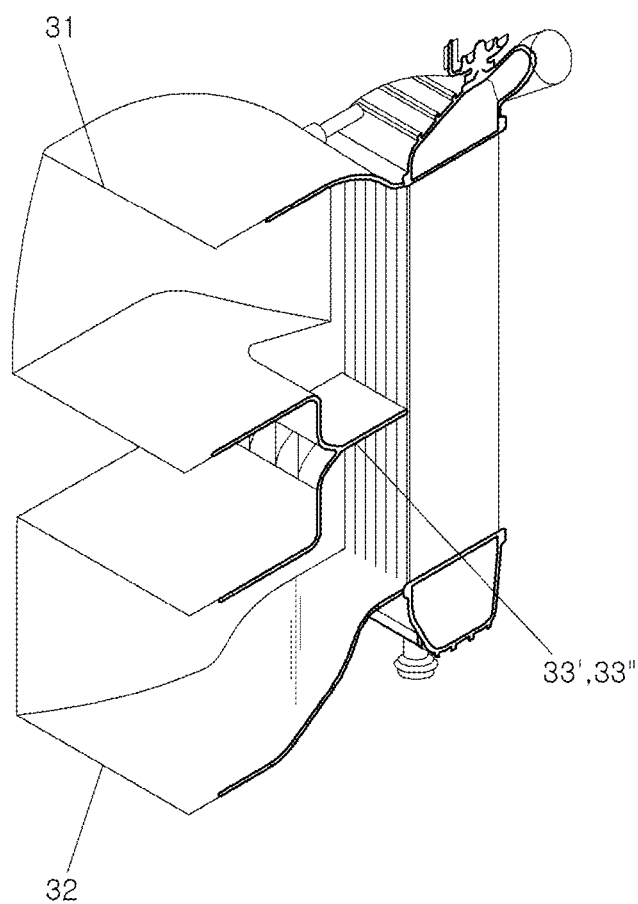
FIG. 5 is a cross-sectional view illustrating a duct type air guide in which a variable screen is installed according to an exemplary embodiment of the present invention.

FIG. 5 is a cross-sectional view illustrating a duct type air guide in which a variable screen is installed according to an exemplary embodiment of the present invention. Referring to FIG. 5, in an air guide structure of a vehicle, a screen (e.g., partition wall) positioned between a radiator grille inlet duct (e.g., upper duct) 31 and a bumper grille inlet duct (e.g., lower duct) 32 is a variable screen 33' or 33" of which a shape or a position may be changed according to a pressure difference resulting from a difference in flow rate between an upper flow and a lower flow introduced through the ducts 31 and 32. In particular, the variable screen 33' or 33" may be formed so that a shape or a position thereof may be changed, and each embodiment will be described below in detail.

Figure 6:
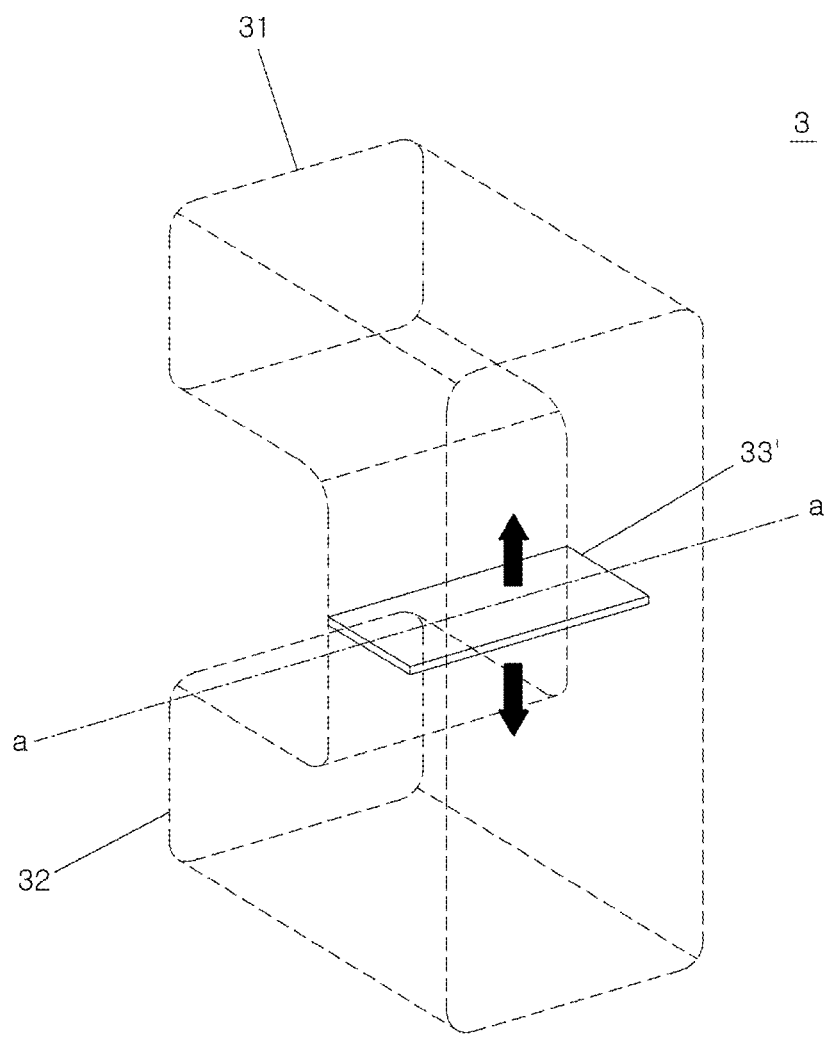
FIG. 6 is a perspective view illustrating an inside of a duct type air guide in which a variable screen is installed according to a first exemplary embodiment of the present invention.

FIG. 6 is a perspective view illustrating an inside of a duct type air guide in which a variable screen is installed according to a first exemplary embodiment of the present invention. Referring to FIG. 6, a position of the variable screen 33' according to a first exemplary embodiment of the present invention may be fixed between the radiator grille inlet duct 31 and the bumper grille inlet duct 32 as in the related art, however, since a flexible material is used for the variable screen 33', a shape of the variable screen 33' may be changed according to a pressure difference between the upper flow and the lower flow introduced through the ducts 31 and 32. The flexible material is a material having elasticity and may be a rubber material.

FIGS. 7A to 7D are views illustrating a duct coupling structure of the variable screen according to the first exemplary embodiment of the present invention. The variable screen 33' according to the first exemplary embodiment of the present invention may be fixed to a duct wall surface 34 between the radiator grille inlet duct 31 and the bumper grille inlet duct 32, and may be fixed by various coupling methods such as bonding or fusion, rivet connection, forcible fitting, casing, and the like.

Figure 7B:
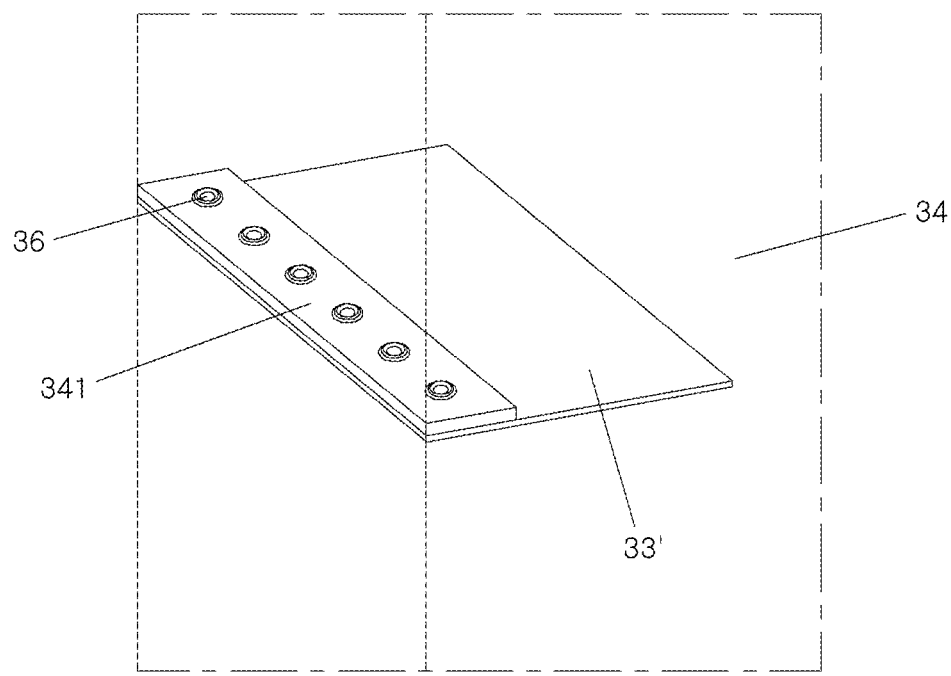

Referring to FIG. 7A, when the variable screen 33' is fixedly coupled by bonding or fusion, a portion of a side surface of the variable screen 33' contacting the duct wall surface 34 is entirely or partially bonded or fused on the duct wall surface 34, and thus, the variable screen 33' is fixedly coupled to the duct wall surface 34 between the radiator grille inlet duct 31 and the bumper grille inlet duct 32. Referring to FIG. 7B, when the variable screen 33' is fixedly coupled by rivet connection, a flange part 341 for connecting the variable screen 33' is formed on the duct wall surface 34. The flange part 341 and one side portion of the variable screen 33' vertically overlap each other, and a rivet 36 is driven, to fixedly couple the variable screen 33' to the duct wall surface 34 between the radiator grille inlet duct 31 and the bumper grille inlet duct 32.

Figure 7C:
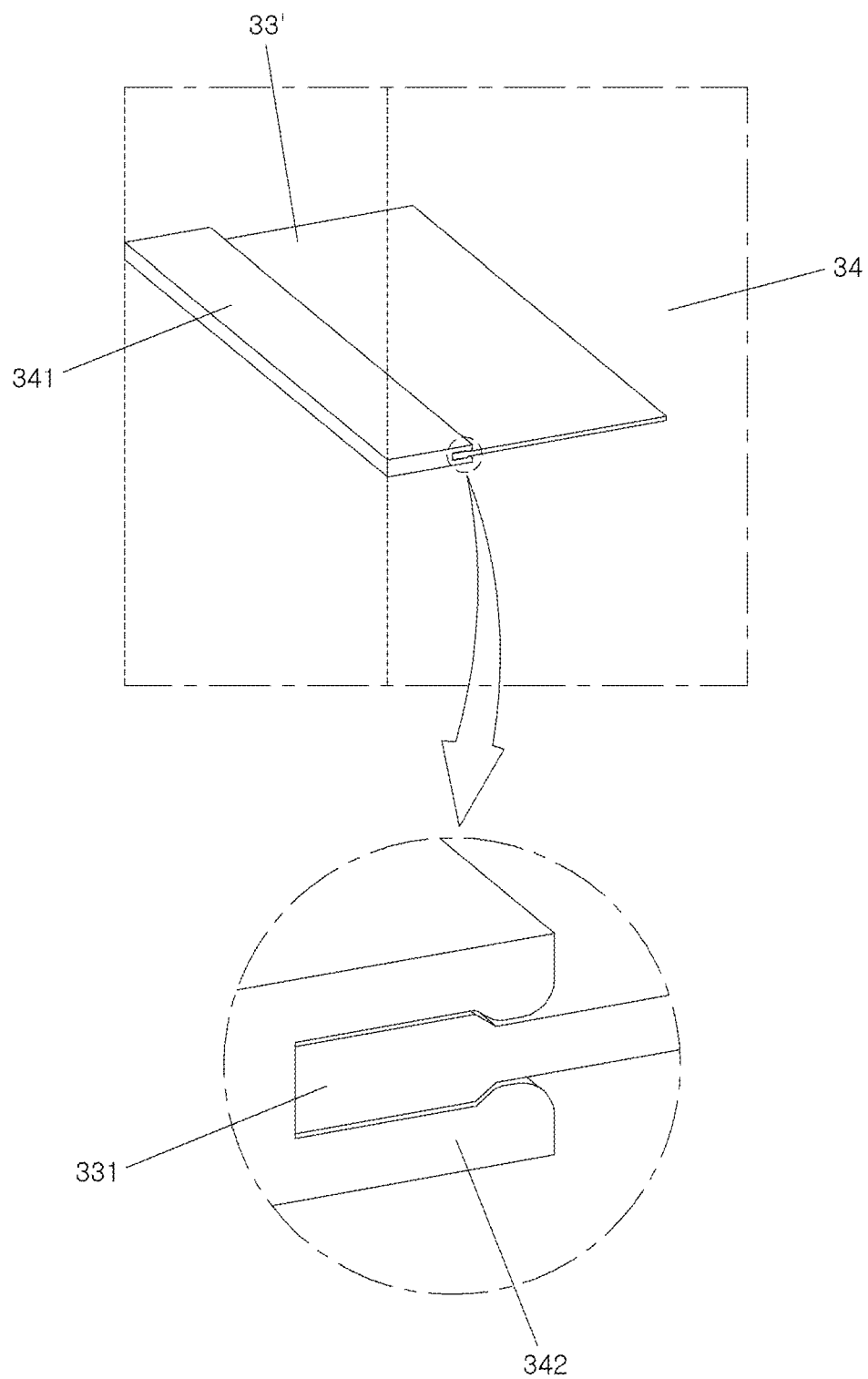

Referring to FIG. 7C, when the variable screen 33' is fixedly coupled by forcible fitting, a flange part 341 for connecting the variable screen 33' is formed on the duct wall surface 34, a forcible fitting groove 342 is formed in the flange part 342, a forcible fitting protrusion 331 is formed at one side surface of the variable screen 33', and the forcible fitting protrusion 331 of the variable screen 33' is forcibly fitted into the forcible fitting groove 342 of the flange part 341. Accordingly, the variable screen 33' is fixedly coupled to the duct wall surface 34 between the radiator grille inlet duct 31 and the bumper grille inlet duct 32.

Figure 7D:
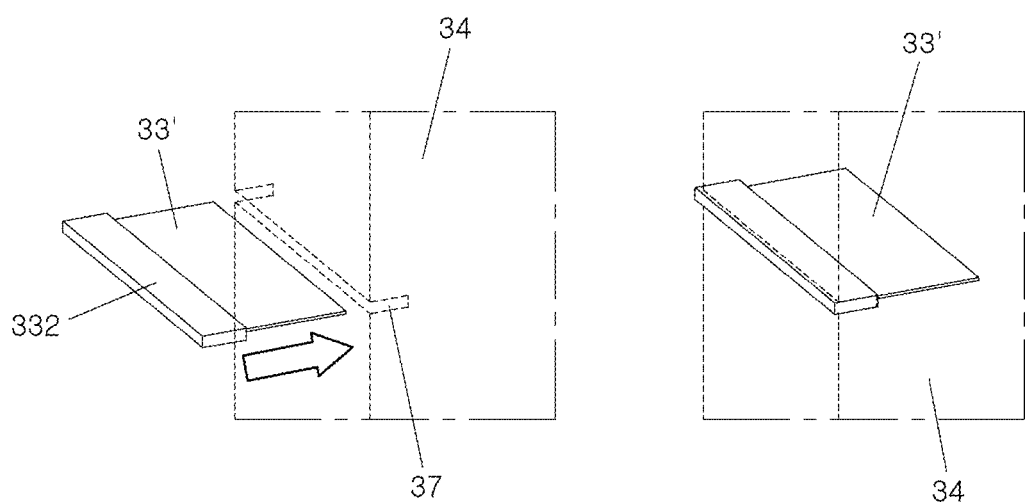

Referring to FIG. 7D, when the variable screen 33' is fixedly coupled by casing, a screen holder 332 is attached on one side surface of the variable screen 33', a coupling aperture 343 in which the screen holder 332 is fixedly coupled is formed in the duct wall surface 34. When the variable screen 33' is inserted into the duct while passing through the coupling aperture 343, the screen holder 332 may be fitted in the coupling aperture 343, to fixedly couple the variable screen 33' to the duct wall surface 34 between the radiator grille inlet duct 31 and the bumper grille inlet duct 32.

Figure 8A:
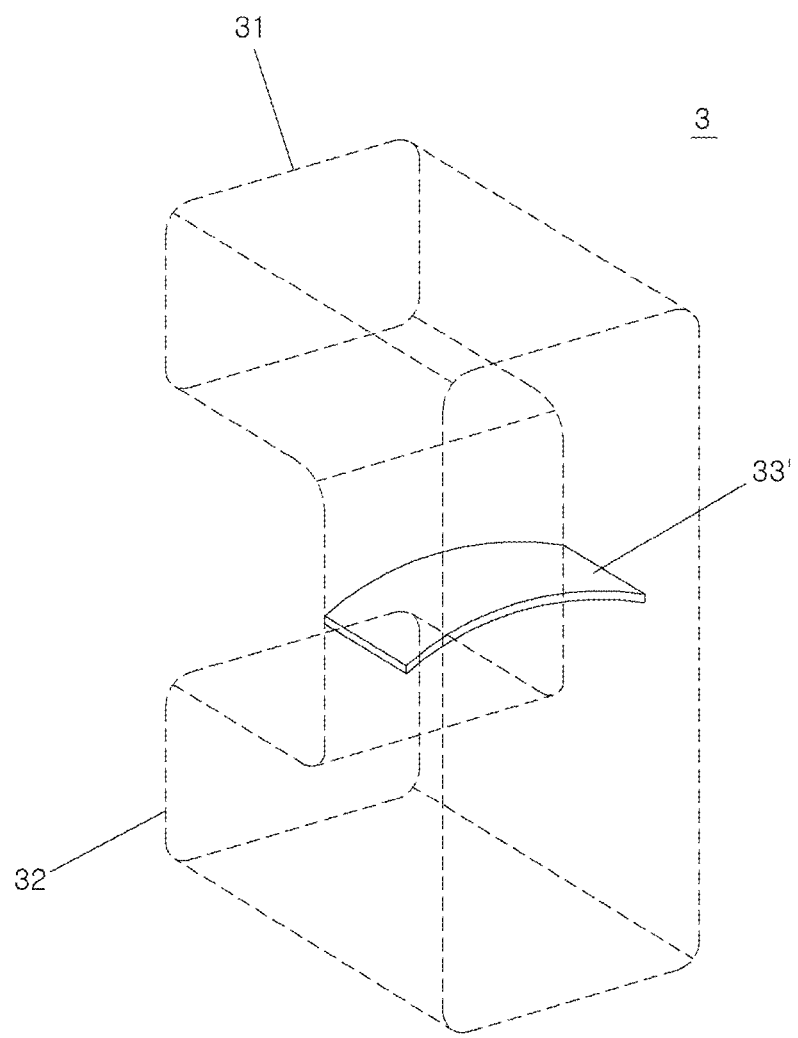
FIGS. 8A to 8C are views illustrating an operation scheme of the variable screen according to the first exemplary embodiment of the present invention.
Figure 8B:
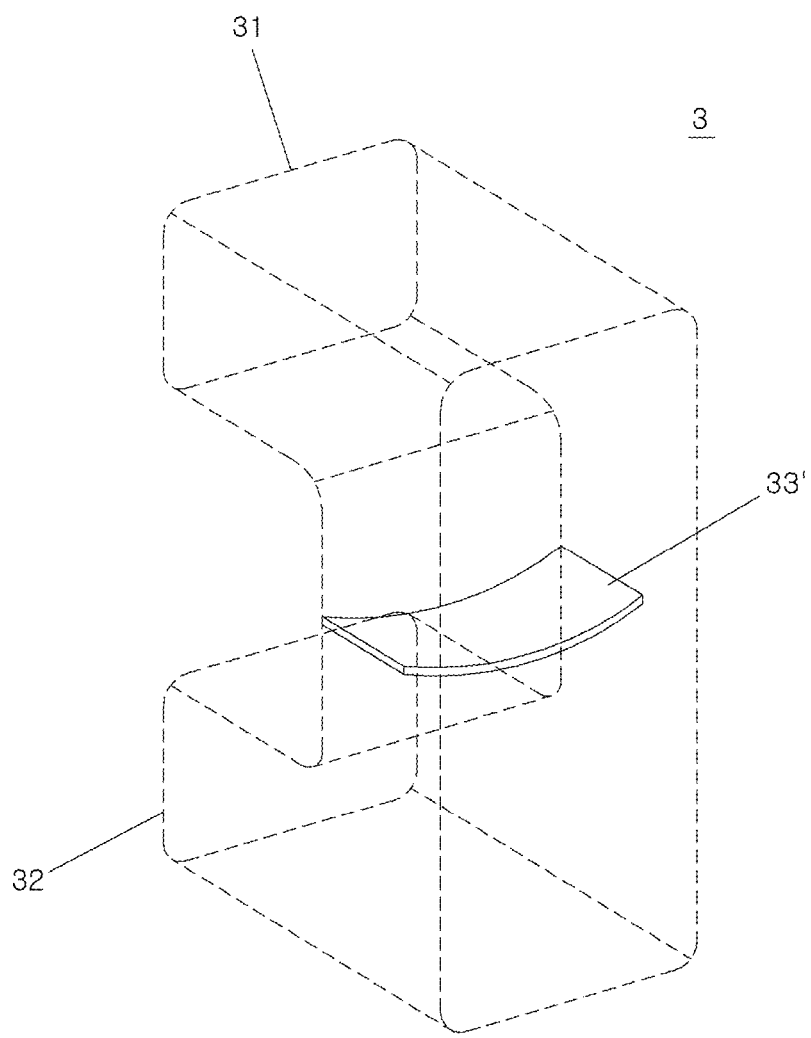
Figure 8C:
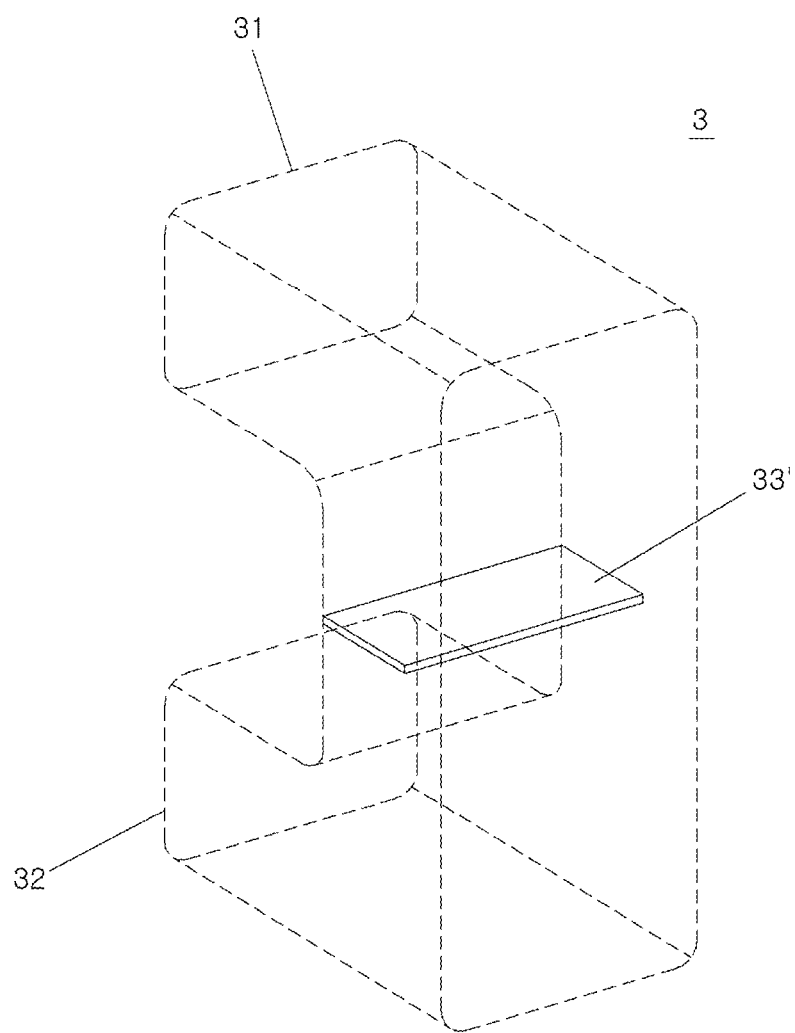

FIGS. 8A to 8C are views illustrating an operation scheme of the variable screen according to the first exemplary embodiment of the present invention. Referring to FIGS. 8A to 8C, the shape of the variable screen 33' according to the first exemplary embodiment of the present invention may be changed according to the difference in flow rate between the two ducts 31 and 32 based on a vehicle speed of the vehicle. Thus, the variable screen 33' may be deformed toward a duct of which the flow rate is less than the other, thereby decreasing a pressure difference resulting from the difference in flow rate.

In other words, when the vehicle travels at high speed and the flow rate of the lower duct 32 is increased, the variable screen may be deformed toward the upper duct 31 (see FIG. 8A). When the flow rate of the upper duct 31 is increased, the variable screen may be deformed toward the lower duct 32 (see FIG. 8B). Additionally, when the vehicle is stopped or travels at low speed, since a pressure difference does not occur, the variable screen 33 may not be deformed (see FIG. 8C). Accordingly, flow rate distribution at a front surface of the intercooler may be performed more efficiently, and as a result, a flow rate of flow passing through the intercooler is increased, thereby improving cooling performance.

Figure 9:
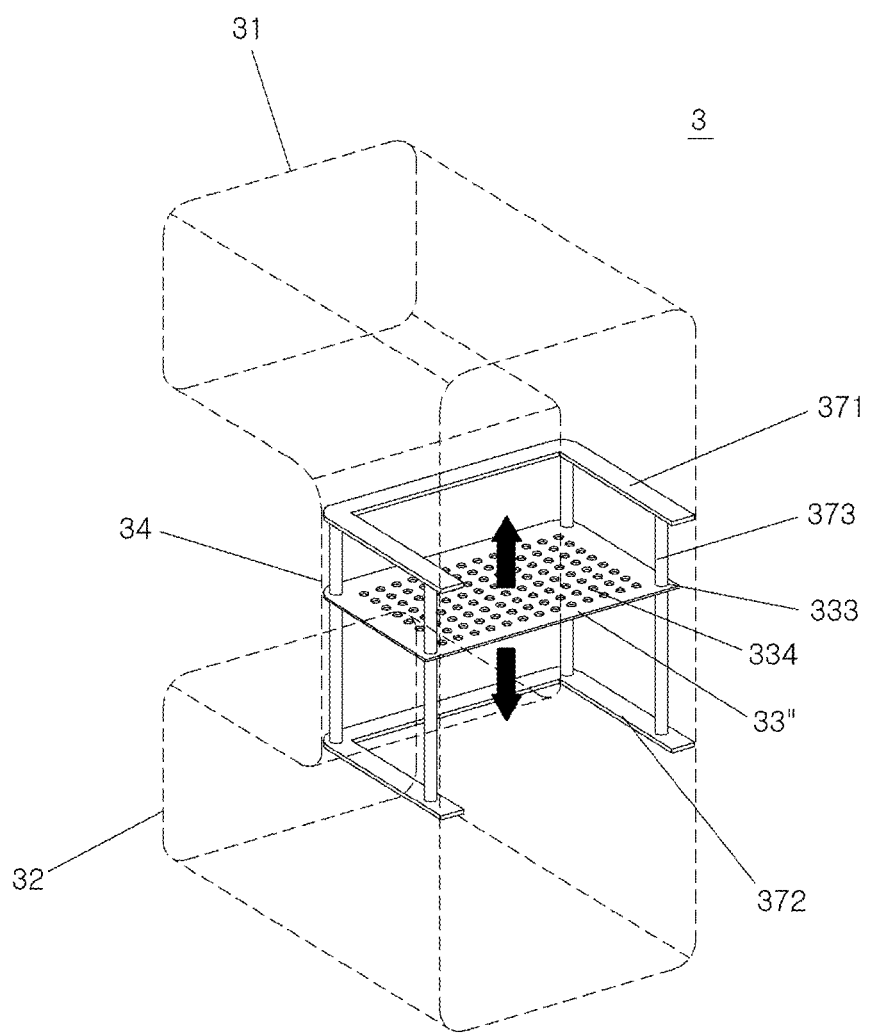
FIG. 9 is a perspective view illustrating an inside of a duct type air guide in which a variable screen is installed according to a second exemplary embodiment of the present invention.

FIG. 9 is a perspective view illustrating an inside of a duct type air guide in which a variable screen is installed according to a second exemplary embodiment of the present invention. Referring to FIG. 9, a variable screen 33" according to a second exemplary embodiment of the present invention is formed so that a position thereof may be vertically changed between the radiator grille inlet duct 31 and the bumper grille inlet duct 32. In particular, an upper frame 371 and a lower frame 372 may be fixedly installed on the duct wall surface 34 between the ducts 31 and 32 while being vertically spaced apart from each other, and a vertical movement guide 373 that guides the variable screen 33" to move vertically may be installed between the upper frame 371 and the lower frame 372.

Further, a guide aperture 333 through which the vertical movement guide 373 passes may be formed in the variable screen 33" to slidably couple the variable screen 33" to the vertical movement guide 373. Meanwhile, a pressure adjustment aperture 334 may be formed in the variable screen 33" according to the second exemplary embodiment of the present disclosure to adjust an amount of vertical movement of the variable screen 33" based on a pressure difference. Such a pressure adjustment aperture 334 may also be applied to the variable screen 33' according to the first exemplary embodiment of the present invention.

Figure 10A:
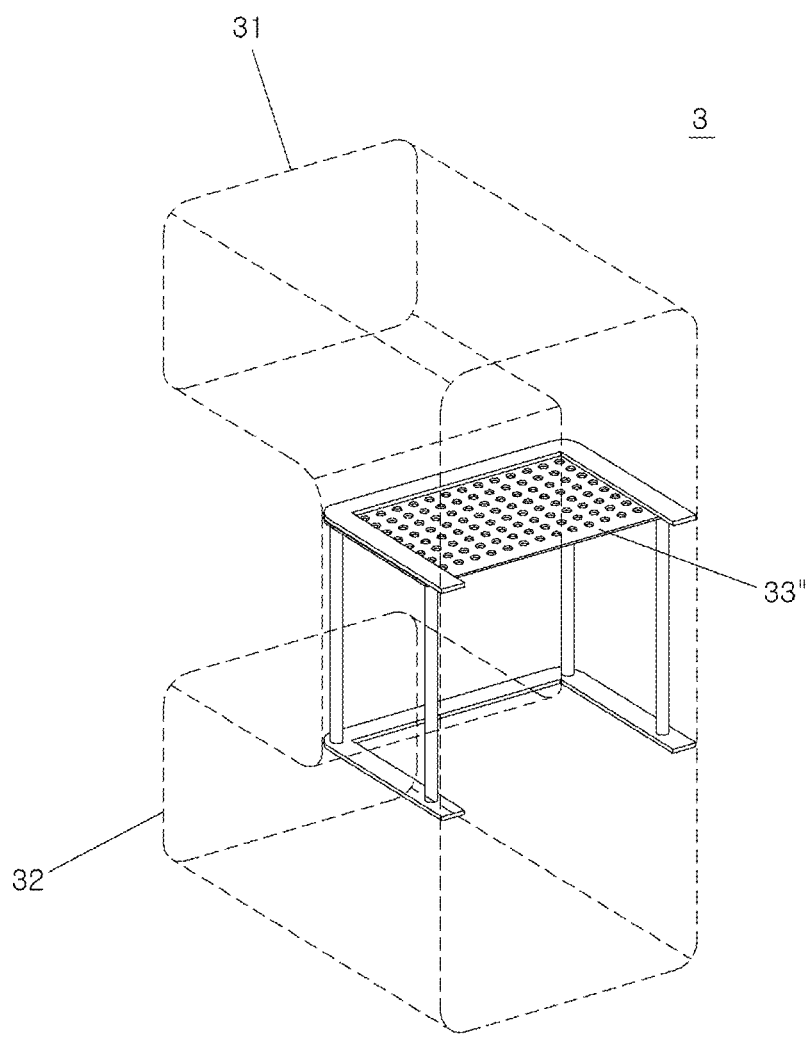
FIGS. 10A to 10C are views illustrating an operation scheme of the variable screen according to the second exemplary embodiment of the present invention.
Figure 10B:
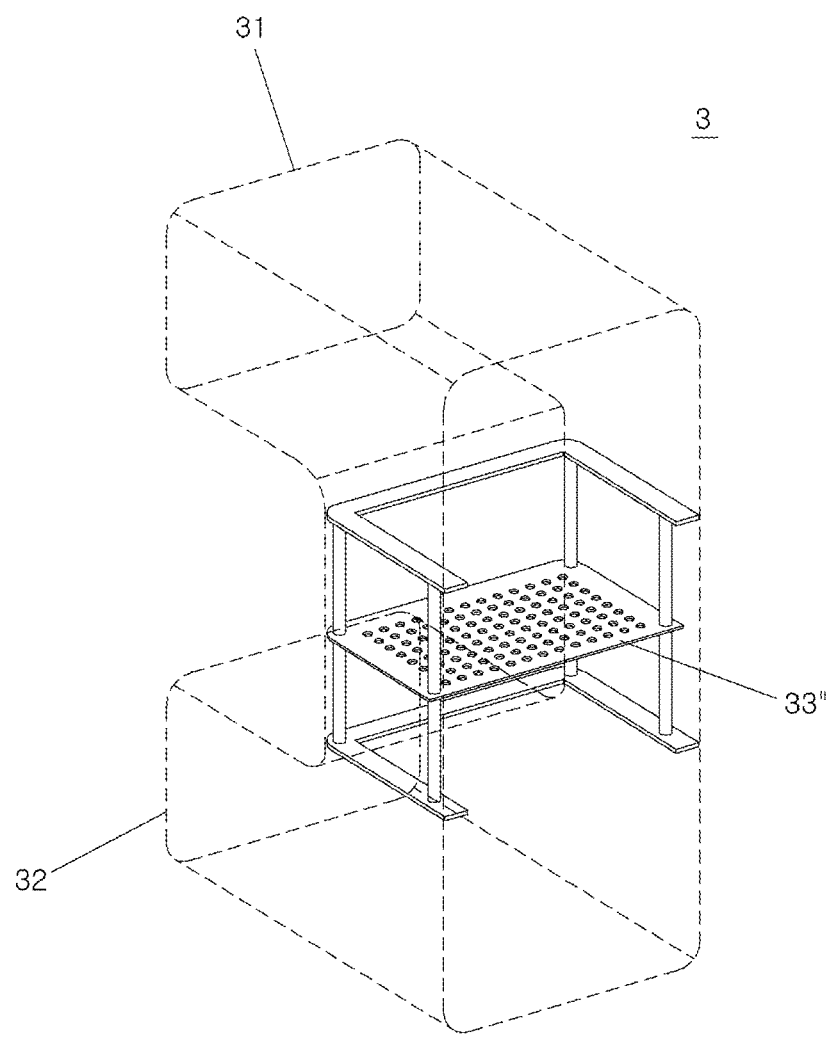
Figure 10C:
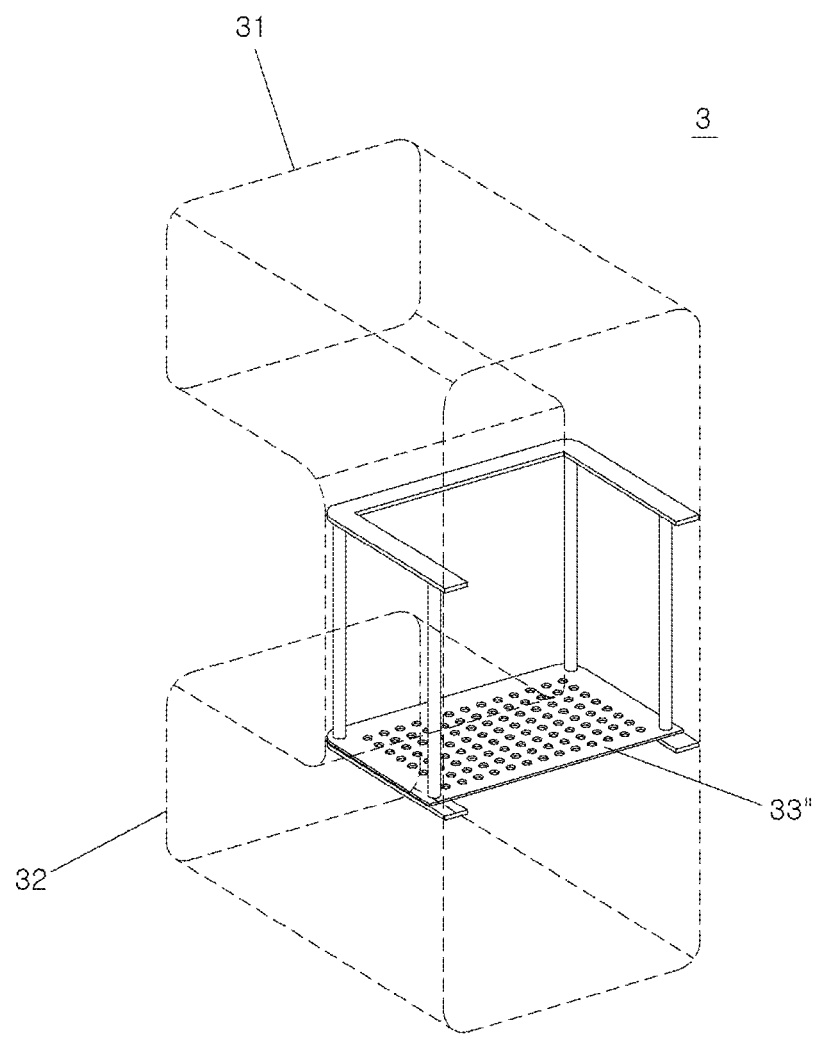

FIGS. 10A to 10C are views illustrating an operation scheme of the variable screen according to the second exemplary embodiment of the present invention. Referring to FIGS. 10A to 10C, a position of the variable screen 33" according to the second exemplary embodiment of the present invention may be moved according to a difference in flow rate between the two ducts 31 and 32 occurring based on a vehicle speed of the vehicle to move the position of the variable screen 33" toward a duct of which the flow rate is less than the other (e.g., a duct among a plurality of ducts having a lower flow rate than the remaining ducts), thereby decreasing a pressure difference resulting from the difference in flow rate.

In other words, when the vehicle travels at high speed and a flow rate of the lower duct 32 is increased (e.g., greater than the flow rate of the upper duct 31), the variable screen 33" moves toward the upper duct 31 (see FIG. 10A). When a flow rate of the upper duct 31 and a flow rate of the lower duct 32 are similar to each other, the variable screen 33" may be positioned in the middle between the upper duct 31 and the lower duct 32 (see FIG. 10B). In addition, when the vehicle is stopped or travels at low speed, since a pressure difference does not occur, the variable screen 33" moves toward the lower duct 32 due to the weight of the screen (see FIG. 10C). Accordingly, flow rate distribution at a front surface of the intercooler may be performed more efficiently, and as a result, a flow rate of flow passing through the intercooler is increased, thereby improving cooling performance.

The following Table 1 shows result data obtained by performing computational fluid dynamics analysis with respect to a volume of air passing through the intercooler at each vehicle speed, through comparison between a duct type air guide (Comparative Example 1) without a screen and a duct type air guide (Comparative Example 2) in which the fixed screen 33 is installed to verify an effect of the duct type air guide in which the variable screen 33' or 33" according to the present invention is installed.

TABLE 1

| Case | Vehicle Speed (km/h) | Volume of Air Passing Through Intercooler (m³/h) |
|---|---|---|
| Present Invention | 7 | 16.9 |
| Comparative Example 1 | (Idle) | 13.4 |
| Comparative Example 2 |  | 14.3 |
| Present Invention | 30 | 83.6 |
| Comparative Example 1 |  | 82.0 |
| Comparative Example 2 |  | 79.0 |
| Present Invention | 100 | 793.6 |
| Comparative Example 1 |  | 771.2 |
| Comparative Example 2 |  | 751.2 |

As shown in Table 1 above, due to a volume of air passing through the intercooler, cooling performance of the intercooler is improved, and the duct type air guide having the variable screen 33' or 33" according to the present invention has superior cooling performance over a full range of vehicle speed in comparison to Comparative Examples 1 and 2. Meanwhile, the duct type air guide (Comparative Example 2) in which the fixed screen 33 is installed according to the related art has lower cooling performance even than the duct type air guide without a screen, except at the time of idling at which the vehicle speed does not exist.

In addition, for a vehicle in which the duct type air guide having the variable screen 33' or 33" according to the present invention is installed, a volume of air passing through a radiator at the time of idling was increased as compared to that of a vehicle in which the duct type air guide (Comparative Example 2) having the fixed type screen 33 is installed according to the related art, as shown in the following Table 2, from which it is confirmed that there is a collateral effect that the cooling performance of the radiator is improved as well.

TABLE 2

| Case | Vehicle Speed (km/h) | Volume of Air Passing Through Radiator (m³/h) |
|---|---|---|
| Present Invention | 7 | 3032.72 |
| Comparative Example 2 | (Idle) | 2251.57 |
| Present Invention | 30 | 3122.15 |
| Comparative Example 2 |  | 3121.03 |
| Present Invention | 100 | 4550.61 |
| Comparative Example 2 |  | 4548.13 |

In accordance with the exemplary embodiments of the present invention, the air guide structure of a vehicle may achieve the effect of improving cooling performance of the intercooler without increasing weight and costs. Additionally, as the cooling performance is improved, a temperature of supercharged air is decreased, such that power performance and fuel efficiency of the engine may be improved.

The exemplary embodiments disclosed in the present specification and the accompanying drawings are used only for the purpose of describing the technical idea of the present invention and are not used to limit the scope of the present invention described in the appended claims. Therefore, it will be understood by those skilled in the art that various modifications may be made and that other equivalent embodiments are available.

What is claimed is:

1. An air guide structure of a vehicle in which a duct for introducing outdoor air into an air cooling device of an engine includes an upper duct positioned in a radiator grille and a lower duct positioned in a bumper grille, the air guide structure comprising:
   a variable screen positioned between the upper duct and the lower duct and formed to have a shape or a position changed according to a difference in flow rate between upper flow and lower flow introduced through the upper duct and the lower duct, respectively,
   wherein the variable screen is disposed on a duct wall surface between the upper duct and the lower duct; and
   a pressure adjustment aperture formed in the variable screen to adjust an amount of deformation or an amount of vertical movement of the variable screen according to the difference in flow rate.

2. The air guide structure of claim 1, wherein the variable screen is formed of a material having elasticity to allow the shape of the variable screen to change.

3. The air guide structure of claim 2, wherein the material having elasticity is a rubber material.

4. The air guide structure of claim 2, wherein the shape of the variable screen is changed according to the difference in flow rate between the upper duct and the lower duct occurring based on a vehicle speed of the vehicle to deform the variable screen toward one of the upper duct and the lower duct having a lesser flow rate to decrease a pressure difference resulting from the difference in flow rate.

5. The air guide structure of claim 2, wherein the variable screen is fixedly coupled to the duct wall surface between the upper duct and the lower duct by bonding or fusion.

6. The air guide structure of claim 2, wherein the variable screen is fixedly coupled to the duct wall surface between the upper duct and the lower duct by rivet connection.

7. The air guide structure of claim 6, wherein a flange part for connecting one side portion of the variable screen using a rivet is formed on the duct wall surface between the upper duct and the lower duct.

8. The air guide structure of claim 2, wherein the variable screen is fixedly coupled to the duct wall surface between the upper duct and the lower duct by forcible fitting.

9. The air guide structure of claim 8, wherein a flange part for connecting the variable screen is formed on the duct wall surface between the upper duct and the lower duct, a forcible fitting groove is formed in the flange part, and a forcible fitting protrusion is formed at one side surface of the variable screen, the forcible fitting protrusion being forcibly fitted into the forcible fitting groove of the flange part.

10. The air guide structure of claim 2, wherein the variable screen is fixedly coupled to the duct wall surface between the upper duct and the lower duct by casing.

11. The air guide structure of claim 10, wherein a screen holder is attached on one side surface of the variable screen, a coupling aperture in which the screen holder is fixedly coupled is formed in the duct wall surface between the upper duct and the lower duct, and when the variable screen is inserted into the duct while passing through the coupling aperture, the screen holder is fitted in the coupling aperture, such that the variable screen is fixedly coupled to the duct wall surface between the upper duct and the lower duct.

12. The air guide structure of claim 1, wherein the position of the variable screen is changed vertically between the upper duct and the lower duct.

13. The air guide structure of claim 12, wherein the position of the variable screen is moved according to the difference in flow rate between the upper duct and the lower duct occurring based on a vehicle speed of the vehicle to move the variable screen toward one of the upper duct and the lower duct having a lesser flow rate to decrease a pressure difference resulting from the difference in flow rate.

14. The air guide structure of claim 12, wherein an upper frame and a lower frame are fixedly installed on the duct wall surface between the upper duct and the lower duct while being vertically spaced apart from each other, and a vertical movement guide that guides the variable screen to move vertically is installed between the upper frame and the lower frame.

15. The air guide structure of claim 14, wherein a guide aperture through which the vertical movement guide passes is formed in the variable screen to slidably couple the variable screen to the vertical movement guide.

* * * * *